US011543446B2

(12) United States Patent
He et al.

(10) Patent No.: US 11,543,446 B2
(45) Date of Patent: Jan. 3, 2023

(54) MULTI-TIME-SCALE RELIABILITY EVALUATION METHOD OF WIND POWER IGBT CONSIDERING FATIGUE DAMAGE AND SYSTEM THEREOF

(71) Applicant: WUHAN UNIVERSITY, Hubei (CN)

(72) Inventors: Yigang He, Hubei (CN); Chuankun Wang, Hubei (CN); Chenyuan Wang, Hubei (CN); Lie Li, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 165 days.

(21) Appl. No.: 17/168,127

(22) Filed: Feb. 4, 2021

(65) Prior Publication Data

US 2022/0074985 A1 Mar. 10, 2022

(30) Foreign Application Priority Data

Sep. 7, 2020 (CN) .......................... 202010927855.4

(51) Int. Cl.
| | |
|---|---|
| *G01R 31/26* | (2020.01) |
| *G06F 30/20* | (2020.01) |
| *F03D 7/04* | (2006.01) |
| *H01L 29/739* | (2006.01) |
| *F03D 17/00* | (2016.01) |

(52) U.S. Cl.
CPC ......... *G01R 31/2619* (2013.01); *F03D 7/043* (2013.01); *F03D 17/00* (2016.05); *G06F 30/20* (2020.01); *H01L 29/7393* (2013.01); *G05B 2219/2619* (2013.01)

(58) Field of Classification Search
CPC ..... G01R 31/2619; F03D 7/043; F03D 17/00; F03D 7/0272; G06F 30/20; G06F 2119/02; G06F 2119/08; H01L 29/7393; G05B 2219/2619; F05B 2260/84; F05B 2270/3032; F05B 2270/332; Y02E 10/72
See application file for complete search history.

(56) References Cited

U.S. PATENT DOCUMENTS

| | | | |
|---|---|---|---|
| 2017/0089325 A1* | 3/2017 | Timbus | .............. G05B 23/0283 |
| 2020/0210537 A1* | 7/2020 | Wang | ...................... G06F 17/16 |
| 2020/0210824 A1* | 7/2020 | Poornaki | .................. G06N 3/08 |
| 2020/0236456 A1* | 7/2020 | Gallo | .................... H04R 1/1008 |

* cited by examiner

*Primary Examiner* — Alvaro E Fortich
*Assistant Examiner* — Zannatul Ferdous
(74) *Attorney, Agent, or Firm* — JCIPRNET (57) ABSTRACT

The disclosure discloses a multi-time-scale reliability evaluation method of a wind power IGBT considering fatigue damage and a system thereof. Lifetime information of a power device is comprehensively extracted by using multiple time scales. An electro-thermal coupling model of an IGBT module is established to obtain a junction temperature data. A steady-state junction temperature database of the IGBT in different aging states is established. Based on a SCADA monitoring data, the junction temperature data is outputted in real-time through the electro-thermal coupling model and a real-time thermal stress cycle number is calculated in a short-term time-scale profile, and a wind speed probability distribution curve is obtained in a long-term time-scale profile. A maximum thermal stress cycle number that the IGBT can withstand in different aging stages is obtained in advance and a cumulative damage degree and an estimated lifetime of the IGBT of the wind power converter are calculated.

20 Claims, 6 Drawing Sheets

FIG. 7

MULTI-TIME-SCALE RELIABILITY EVALUATION METHOD OF WIND POWER IGBT CONSIDERING FATIGUE DAMAGE AND SYSTEM THEREOF

CROSS-REFERENCE TO RELATED APPLICATION

This application claims the priority benefit of China application serial no. 202010927855.4, filed on Sep. 7, 2020. The entirety of the above-mentioned patent application is hereby incorporated by reference herein and made a part of this specification.

BACKGROUND

Technical Field

The disclosure belongs to the field of reliability of core components of power electronic equipment, and more specifically, relates to a multi-time-scale reliability evaluation method of a wind power IGBT considering fatigue damage and a system thereof.

Description of Related Art

The wind power converter is a core component in a wind energy conversion system. Long-term, high-frequency, and high-intensity operating conditions result in a large number of thermal stress shocks on the converter, so the converter is one of the components most prone to damage in the wind energy conversion system. With advantages such as a high switching speed, a simple driving circuit, good voltage resistivity, and a large current capacity, the insulated gate bipolar transistor (IGBT) has been widely used in wind power converters, and failure of a wind power converter is often caused by failure of the IGBT. Performing reliability evaluation on the IGBT of a wind power converter can ensure safe and reliable operation of the wind power generation system and reduce the operation and maintenance costs of a wind farm. Due to the randomness and volatility of wind speed, the IGBT is subjected to significantly fluctuating thermal stress cycles, which increases the difficulty in evaluating the reliability of the IGBT.

At this stage, reliability evaluation of an IGBT module of a wind power converter domestically and abroad mainly relies on reliability evaluation manuals and junction temperature data. When evaluating the IGBT of a wind power converter based on the reliability evaluation manuals, generally only one single operating condition can be considered, which does not meet the requirements for online monitoring, and the application scope and accuracy of the reliability evaluation manuals are very limited. The junction temperature data can be used to accurately perform reliability evaluation against the background of wind power generation applications. Online acquisition of the junction temperature may include direct measurement and indirect measurement. Direct measurement involves obtaining junction temperature data by embedding an integrated sensor inside the IGBT module or through an infrared thermometer. With the integrated sensor, it is necessary to consider the electromagnetic compatibility of the integrated sensor in the IGBT design and production, and the packaging of the IGBT module affects the accuracy of measurement of the internal junction temperature by the infrared thermometer. In addition, the direct measurement method has issues of data transmission delay and increased costs in actual engineering. Indirect measurement involves estimating the junction temperature of the IGBT in real-time by establishing an electro-thermal coupling model, which has advantages of low delay and strong online monitoring capabilities.

SUMMARY

In response to the above defects of the related art, the disclosure provides a multi-time-scale reliability evaluation method of a wind power IGBT considering fatigue damage and a system thereof, in which when considering the effect of fatigue damage of an IGBT, lifetime information of a power device is comprehensively extracted by using multiple time scales, the dependence of a single observation scale on the length of a time series of a SCADA monitoring data is reduced, the calculation efficiency of the reliability evaluation is improved, and strong online monitoring capabilities are achieved.

To achieve the above objective, an aspect of the disclosure provides a multi-time-scale reliability evaluation method of a wind power IGBT considering fatigue damage, including the following steps. (1) A time scale of reliability evaluation is divided, and lifetime information of a power device is comprehensively extracted by using multiple time scales. (2) An electro-thermal coupling model of an IGBT module is established for a topology of a wind power converter and an IGBT model to obtain a junction temperature data, and combined with an IGBT fatigue damage theory, a steady-state junction temperature database of the IGBT in different aging states is established. (3) In a short-term time-scale profile, effects of an ambient temperature and a wind speed are fully considered based on a SCADA monitoring data, the junction temperature data is outputted in real-time through the electro-thermal coupling model, and a real-time thermal stress cycle number is calculated. (4) In a long-term time-scale profile, a Weibull probability distribution model of the wind speed is established based on the SCADA monitoring data of a wind turbine to obtain a wind speed probability distribution curve, and after normalization, a thermal stress shock inspection number probability distribution is conducted, and combined with a Bayerer lifetime prediction model and the steady-state junction temperature database, a maximum thermal stress cycle number that the IGBT can withstand in different aging stages is obtained in advance. (5) A cumulative damage degree and an estimated lifetime of the IGBT of the wind power converter are calculated by taking the thermal stress cycle number as a connection between evaluation results of the different time scales.

In some selective embodiments, the step of dividing the time scale of reliability evaluation includes the following. In the long-term time-scale profile, power device aging characteristics are primarily considered, and transient details of junction temperature fluctuations are ignored to only consider a steady-state junction temperature and thereby maintain a high calculation efficiency. In the short-term time-scale profile, the effects of the wind speed and the ambient temperature are primarily considered, and an observed junction temperature fluctuation data is fully considered.

In some selective embodiments, the step of establishing the steady-state junction temperature database of the IGBT in different aging states includes the following. A cumulative damage degree D is used to reflect a damage degree of the IGBT module based on a fatigue damage theory. When $D \leq a$ a thermal network parameter of the electro-thermal coupling model is not corrected; when the cumulative damage degree $a < D \leq b$, the thermal network parameter of the electro-thermal coupling model is increased according to a first predetermined value; when the cumulative damage degree b<D≤c, the thermal network parameter of the electro-thermal coupling model is increased according to a second predetermined value; when the cumulative damage degree c.<D≤d, the thermal network parameter of the electro-thermal coupling model is increased according to a third predetermined value; and when the cumulative damage degree d<D≤e, the thermal model parameter of the electro-thermal coupling model is increased according to a fourth predetermined value, where the first predetermined value, the second predetermined value, the third predetermined value, and the fourth predetermined value sequentially increase, and values of a, b, c, d, and e sequentially increase. Sampling is performed between a cut-in wind speed and a cut-out wind speed of the wind turbine to obtain characteristic operating conditions of the wind power IGBT, and steady-state junction temperature values outputted by the electro-thermal coupling model in different aging states of each characteristic operating condition are calculated to establish the steady-state junction temperature database of the IGBT.

In some selective embodiments, the cumulative damage degree is determined according to $$D = \frac{N}{N_f},$$

where $N_f$ is a fail cycle number of the IGBT module under a cyclic effect of a stress with an amplitude unchanged, and N represents a number of cycles of being subjected to the stress.

In some selective embodiments, Step (4) includes the following. The Weibull probability distribution model of the wind speed is established based on the SCADA monitoring data of the wind turbine to obtain the wind speed probability distribution curve. After normalization, the thermal stress shock inspection number probability distribution is conducted, and an aging process of the IGBT is determined to select a steady-state junction temperature database corresponding to an aging stage. Combined with the Bayerer lifetime prediction model and the selected steady-state junction temperature database, the maximum thermal stress cycle number that the IGBT can withstand in different aging stages is obtained in advance.

In some selective embodiments, Step (5) includes the following. In the short-term time-scale profile, the real-time thermal stress cycle number of the IGBT module in a current operating state is obtained. In the long-term time-scale profile, a maximum withstanding cyclic shock number of the IGBT considering fatigue damage is obtained. Output results at the respective time scales are synthesized by taking the thermal stress cycle number as a connection to calculate a real-time cumulative damage degree and the estimated lifetime of the IGBT of the wind power converter.

In some selective embodiments, the real-time cumulative damage degree of the IGBT of the wind power converter is calculated according to $$D_t = \frac{N_t}{N_m},$$

where $N_t$ represents the real-time thermal stress cycle number of the IGBT module in a current operating state obtained in the short-term time-scale profile, and $N_m$ represents the maximum withstanding cyclic shock number of the IGBT considering fatigue damage obtained in the long-term time-scale profile.

In some selective embodiments, the estimated lifetime is calculated according to $$S = \left(\frac{T}{D_t}\right) / (3600 * 24 * 365),$$

where T represents a length of a time series of the monitoring data.

Another aspect of the disclosure provides a multi-time-scale reliability evaluation system of a wind power IGBT considering fatigue damage, including a time scale division module, a steady-state junction temperature database establishment module, a short-term reliability analysis module, a long-term reliability analysis module, and a reliability evaluation module. The time scale division module is configured to divide a time scale of reliability evaluation and comprehensively extract lifetime information of a power device by using multiple time scales. The steady-state junction temperature database establishment module is configured to establish an electro-thermal coupling model of an IGBT module for a topology of a wind power converter and an IGBT model to obtain a junction temperature data, and combined with an IGBT fatigue damage theory, establish a steady-state junction temperature database of the IGBT in different aging states. The short-term reliability analysis module is configured to, in a short-term time-scale profile, fully consider effects of an ambient temperature and a wind speed based on a SCADA monitoring data, output the junction temperature data in real-time through the electro-thermal coupling model, and calculate a real-time thermal stress cycle number. The long-term reliability analysis module is configured to, in a long-term time-scale profile, establish a Weibull probability distribution model of the wind speed based on the SCADA monitoring data of a wind turbine to obtain a wind speed probability distribution curve, and after normalization, conduct a thermal stress shock inspection number probability distribution, and combined with a Bayerer lifetime prediction model and the steady-state junction temperature database, obtain in advance a maximum thermal stress cycle number that the IGBT can withstand in different aging stages. The reliability evaluation module is configured to calculate a cumulative damage degree and an estimated lifetime of the IGBT of the wind power converter by taking the thermal stress cycle number as a connection between evaluation results of the different time scales.

Another aspect of the disclosure provides a computer-readable storage medium having a computer program stored thereon, where the computer program implements the steps of the method according to any one of the above items when the computer program is executed by a processor.

In general, compared with the related art, the above technical solutions conceived in the disclosure can achieve the following advantageous effects.

1. Time constant characteristics of the wind speed, the ambient temperature, and the power device are comprehensive considered, the time scale of reliability evaluation is divided to obtain more lifetime information, such as lifetime loss caused by fatigue damage of the power device, the wind speed fluctuations, and the ambient temperature fluctuations, so as to ensure the accuracy of the evaluation results.

2. When considering the effect of fatigue damage in the multiple time scales, the steady-state junction temperature data and the probability distribution are used to simulate the aging process of the IGBT in the long-term time-scale profile to obtain the maximum thermal stress cycle number considering the effect of fatigue damage. The dependence of a single observation scale on the length of the time series of the SCADA data is reduced, and the calculation efficiency is improved.

3. The multi-time-scale method has strong online monitoring capabilities, and based on the SCADA monitoring data and the junction temperature data outputted by the electro-thermal coupling model, and the real-time thermal stress cycle number of the IGBT is calculated by using the rainflow-counting method. Also, the maximum thermal stress cycle number of the IGBT considering fatigue damage is comprehensively considered, the cumulative damage degree is calculated in real-time, and the health condition of the IGBT module is reflected. This method is more in line with the performance requirements for health monitoring of an IGBT of a wind power converter against the background of smart grids and the energy Internet.

DESCRIPTION OF THE EMBODIMENTS

To make the objectives, technical solutions, and advantages of the disclosure more apparent, the disclosure will be described in further detail below with reference to the accompanying drawings and embodiments. It should be understood that the specific embodiments described herein are merely illustrative of the disclosure and are not intended to limit the disclosure. In addition, the technical features involved in the various embodiments of the disclosure described below may be combined with each other as long as they do not conflict with each other.

In the examples of the disclosure, terms such as "first", "second", etc. are used to distinguish among different objects and are not necessarily used to describe a specific order or sequence.

Embodiment 1

Figure 1:
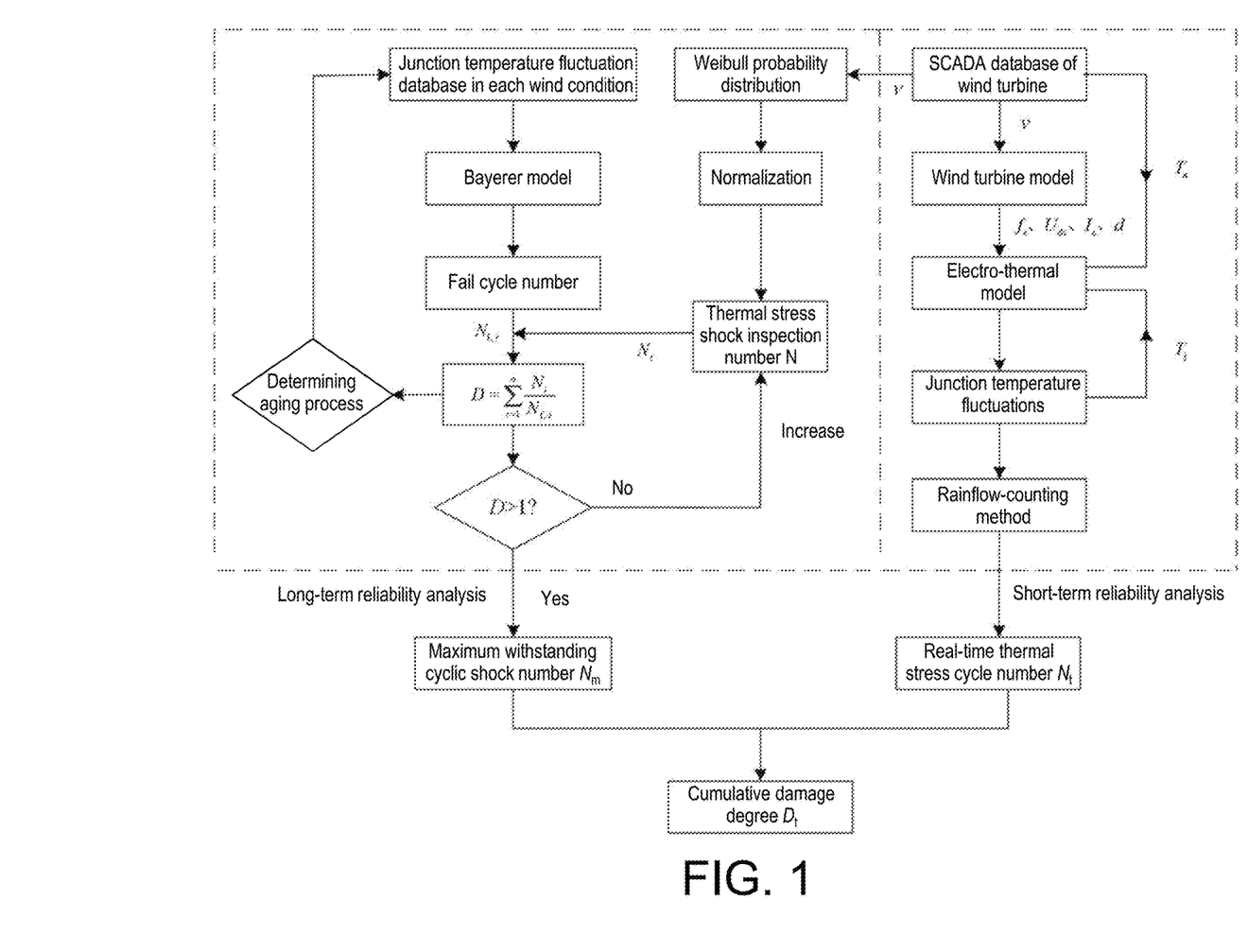
FIG. 1 is a flowchart of a multi-time-scale reliability evaluation method of a wind power IGBT considering fatigue damage according to an embodiment of the disclosure.

FIG. 1 is a flowchart of a multi-time-scale reliability evaluation method of a wind power IGBT considering fatigue damage provided in an embodiment of the disclosure. The method shown in FIG. 1 includes the following steps.

(1) A time scale of reliability evaluation is divided into a long-term time scale and a short-term time scale, and lifetime information of a power device is comprehensively extracted by using multiple time scales.

Through Step (1), effective consideration of different influencing factors (such as a wind speed, an ambient temperature, and power device aging characteristics) in the reliability evaluation process is realized.

(2) According to a topological structure of a wind power converter and a specific model of an IGBT, an electro-thermal coupling model of an IGBT module is established to obtain a junction temperature data, and combined with an IGBT fatigue damage theory, an aging process of the IGBT is divided into several stages, and a steady-state junction temperature database of the IGBT in different aging states is established.

(3) In a short-term time-scale profile, based on a SCADA monitoring data, effects of an ambient temperature and a wind speed are fully considered, the junction temperature data is outputted in real-time through the electro-thermal coupling model, and a real-time thermal stress cycle number $N_t$ is calculated.

The real-time thermal stress cycle number $N_t$ may be calculated by a rainflow-counting method.

(4) In a long-term time-scale profile, a Weibull probability distribution model of the wind speed is established based on the SCADA monitoring data of a wind turbine to obtain a wind speed probability distribution curve, and after normalization, a thermal stress shock inspection number probability distribution is conducted. Combined with a Bayerer lifetime prediction model and the steady-state junction temperature database, a maximum thermal stress cycle number $N_m$ that the IGBT can withstand in different aging stages is obtained in advance.

(5) With the thermal stress cycle number connecting evaluation results of the different time scales, a real-time cumulative damage degree $D_t$ and an estimated lifetime of the IGBT of the wind power converter are calculated to realize advantage complementation of reliability analyses of the different time scales and also take into account a calculation efficiency of the cumulative damage degree while considering the fatigue cumulative damage.

Further, in Step (1), when dividing the time scale of the reliability evaluation of the IGBT module of the wind power converter, multiple factors (e.g., the wind speed, the ambient temperature, the power device characteristics, etc.) that affect the device are considered. These factors involve multidisciplinary models of different time constants, so it is difficult to evaluate these models at the same time. Inspired by the use of lenses having different focal lengths to obtain images of different sizes and details in photography, the time scale of the evaluation is divided according to time constant characteristics of each influencing factor to form the multiple time scales. The lifetime information of the device is comprehensively extracted by using the multiple time scales to realize effective consideration of the different influencing factors in the reliability evaluation process.

A thermal time constant of the power device is much smaller than fluctuation cycles of the wind speed and the ambient temperature. Therefore, when considering the effect of fatigue damage, the effect of a transient-state process of the wind turbine system on the junction temperature of the device may be ignored, and operating conditions of the wind turbine system are assumed to be a series of steady-state operating conditions to only consider the steady-state junction temperature of the device. In addition, the aging cycle of the power device may be as long as several years, which is much longer than a real-time observation cycle, and it may be considered that a health state of the IGBT remains unchanged at short-term observation scale. In the long-term time-scale profile, the power device aging characteristics are primarily considered, and the transient details of junction temperature fluctuations are ignored to only consider the steady-state junction temperature and thereby maintain a high calculation efficiency. In the short-term time-scale profile, the effects of the wind speed and the ambient temperature are primarily considered, and the observed junction temperature fluctuation data is fully considered. The configuration of the multiple time scales is conducive to capturing different aspects of lifetime information in the reliability evaluation process of the IGBT of the wind power converter and improving the calculation efficiency.

Further, in Step (2), a method of establishing the steady-state junction temperature database is as follows.

Starting from a topology of the wind power converter, combined with IGBT operating characteristics (a switching frequency $f_s$, a DC-side voltage $U_{dc}$, an on-current $I_c$, and a duty cycle $\delta$), an IGBT power loss model is derived. An IGBT thermal network equivalent model is derived based on a physical structure and an internal heat conduction process of the IGBT module. An electro-thermal coupling simulation model is constructed in MATLAB/Simulink. Power loss values outputted by the power loss model are sent to the thermal network equivalent model of the IGBT module to perform simulated junction temperature calculation.

The IGBT module needs to withstand a large number of thermal stress cyclic shocks in the operating process. Assuming that $N_f$ is a fail cycle number of the IGBT module under the cyclic effect of a stress with an amplitude unchanged, when it is subjected to the cyclic effect of the stress for N times and N is less than $N_f$, although the IGBT module does not fail due to fatigue damage, a certain degree of fatigue damage has been generated. The cumulative damage degree may be used to express the specific size of the fatigue damage as follows:

$$D = \frac{N}{N_f}$$

If the device is subjected to the effect of k constant-amplitude stresses, and the number of shocks generated by each constant-amplitude stress is $N_{f,i}$ times, the cumulative damage degree in this operating condition may be expressed as:

$$D = \sum_{i=1}^{k} D_i = \sum_{i=1}^{k} \frac{N_i}{N_{f,i}}$$

$N_i$ represents an $i^{th}$ constant-amplitude stress, $D_i$ represents a fatigue damage generated by the $i^{th}$ constant-amplitude stress, and $N_{f,i}$ represents a fail cycle number under the cyclic effect of the $i^{th}$ stress with a constant unchanged amplitude.

When the cumulative damage degree D reaches 1, it means that fatigue failure occurs in the device. In the actual operating process of the wind power converter, the solder layer of the IGBT module is prone to fatigue damage, and the thermal resistance increases as the device material ages. Considering the non-negligible effect of the aging process of the IGBT module itself on lifetime prediction, it is necessary to timely update thermal model parameters in the electro-thermal coupling model.

Considering the non-negligible effect of the aging process of the IGBT module itself on lifetime prediction, it is necessary to timely update thermal model parameters in the electro-thermal coupling model. When $D \leq a$, a thermal network parameter of the electro-thermal coupling model is not corrected; when the cumulative damage degree $a < D \leq b$, the thermal network parameter of the electro-thermal coupling model is increased according to a first predetermined value; when the cumulative damage degree $b < D \leq c$, the thermal network parameter of the electro-thermal coupling model is increased according to a second predetermined value; when the cumulative damage degree $c. < D \leq d$, the thermal network parameter of the electro-thermal coupling model is increased according to a third predetermined value; when the cumulative damage degree $d < D \leq e$, the thermal model parameter of the electro-thermal coupling model is increased according to a fourth predetermined value. The first predetermined value, the second predetermined value, the third predetermined value, and the fourth predetermined value sequentially increase, and the values of a, b, c, d, and e sequentially increase.

As an exemplary embodiment, when $D \leq 0.2$, it is determined that the IGBT module is in a health stage I, and the thermal network parameter of the electro-thermal coupling model is not corrected; when the cumulative damage degree $0.2 < D \leq 0.4$, it is determined that the IGBT module is in a health stage II, and the thermal network parameter of the electro-thermal coupling model is increased by 10%; when the cumulative damage degree $0.4 < D \leq 0.6$, it is determined that the IGBT module is in a health stage III, and the thermal network parameter of the electro-thermal coupling model is increased by 20%; when the cumulative damage degree $0.6 < D \leq 0.8$, it is determined that the IGBT module is in a health stage IV, and the thermal network parameter of the electro-thermal coupling model is increased by 30%; when the cumulative damage degree $0.8 < D \leq 1$, it is determined that the IGBT module is in a health stage V, and the thermal model parameter of the electro-thermal coupling model is increased by 40%.

Uniform sampling at an interval of 1 m/s is performed between a cut-in wind speed and a cut-out wind speed of the wind turbine to obtain characteristic operating conditions of the wind power IGBT. The steady-state junction temperature values outputted by the electro-thermal coupling model in different aging states of each characteristic operating condition are calculated to establish the steady-state junction temperature database of the IGBT.

Further, in Step (4), a process of a method of the reliability evaluation in the long-term time-scale profile is as follows.

1) The Weibull probability distribution model of the wind speed is established based on the SCADA monitoring data of the wind turbine to obtain the wind speed probability distribution curve.

2) After normalization, the thermal stress shock inspection number probability distribution is conducted, and the aging process of the IGBT is determined to select a steady-state junction temperature database corresponding to the aging stage.

3) Combined with the Bayerer lifetime prediction model and the steady-state junction temperature database, the maximum thermal stress cycle number $N_m$ that the IGBT can withstand in different aging stages is obtained in advance.

Further, in Step (5), output results of calculations of the different time scales are synthesized to perform the reliability evaluation. In the short-term time-scale profile, the real-time thermal stress cycle number $N_t$ of the IGBT module in a current operating state is obtained. In the long-term time-scale profile, the maximum withstanding cyclic shock number $N_m$ of the IGBT considering the fatigue damage is obtained. With the thermal stress cycle number connecting the multiple time scales, and the output results at the two time scales are synthesized to calculate the real-time cumulative damage degree $D_t$ and the estimated lifetime S of the IGBT of the wind power converter.

$$D_t = \frac{N_t}{N_m}$$

$$S = \left(\frac{T}{D_t}\right) / (3600*24*365)$$

where T represents a length of a time series of the monitoring data.

In the multi-time-scale reliability evaluation method proposed by the disclosure, when considering the effect of fatigue damage of the IGBT, the dependence of a single observation scale on the length of the time series of the SCADA data is reduced, the calculation efficiency of the reliability evaluation is improved, and strong online monitoring capabilities are achieved.

Embodiment 2

A 2 MW doubly-fed wind power generation system will be described below as a specific example, and the specific parameters are shown in Table 1. A reliability analysis of an IGBT of a grid-side converter is performed by using a multi-time-scale method considering fatigue damage, and the disclosure will be further described in detail with reference to the accompanying drawings.

TABLE 1

Wind power generation system parameters

| Category | Parameter |
| --- | --- |
| Rated power/MW | 2 |
| Cut-in wind speed/(m/s) | 3 |
| Rated wind speed/(m/s) | 11 |
| Cut-out wind speed/(m/s) | 25 |
| Grid-side voltage/V | 690 |
| Grid-side frequency/Hz | 50 |
| IGBT switching frequency/Hz | 3500 |
| DC-side voltage/V | 1100 |
| IGBT model | Infineon-FF1400R17IP4 |

Referring to FIG. 1, the embodiment of the disclosure includes the following steps.

(1) A time scale of reliability evaluation of an IGBT of a wind power converter is divided, and lifetime information of a power device is comprehensively extracted by using multiple time scales.

In a long-term time-scale profile, power device aging characteristics are primarily considered, and transient details of junction temperature fluctuations are ignored to only consider the steady-state junction temperature and thereby maintain a high calculation efficiency. In a short-term time-scale profile, effects of a wind speed and an ambient temperature are primarily considered, and an observed junction temperature fluctuation data is fully considered.

(2) For a topology of the wind power converter and an IGBT model, an electro-thermal coupling model of an IGBT module is established to obtain a junction temperature data, and combined with an IGBT fatigue damage theory, its aging process is divided into five stages, and a steady-state junction temperature database of the IGBT in different aging states is established.

Figure 2:
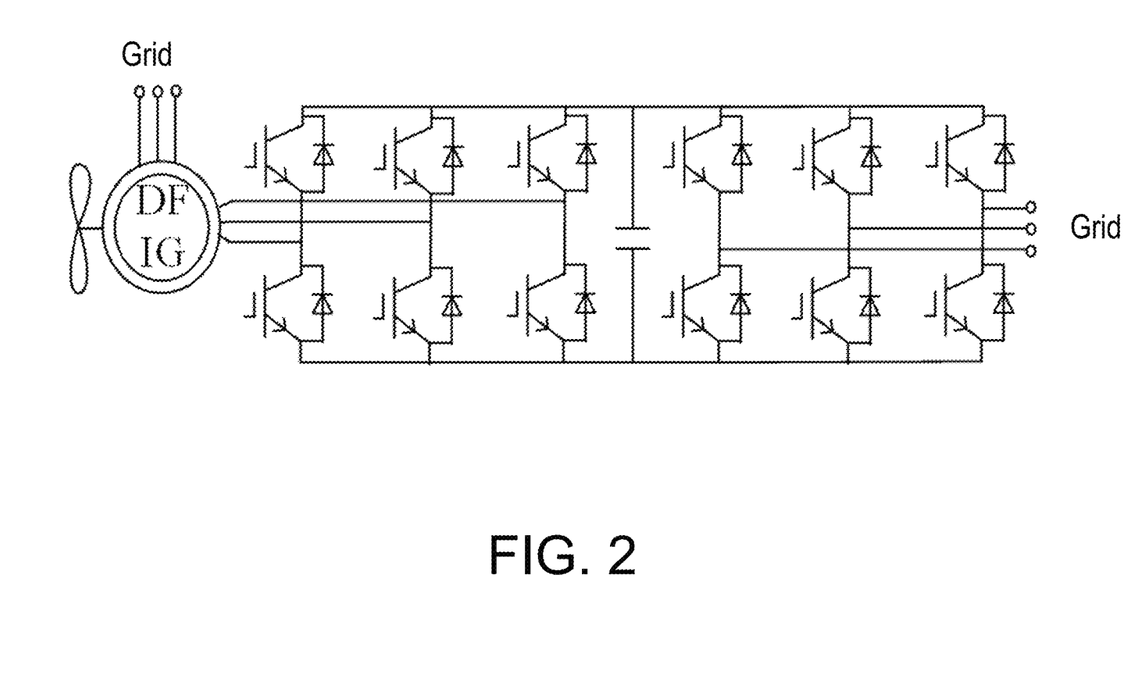
FIG. 2 is a topological structure of a doubly-fed wind power converter according to an embodiment of the disclosure.
Figure 3:
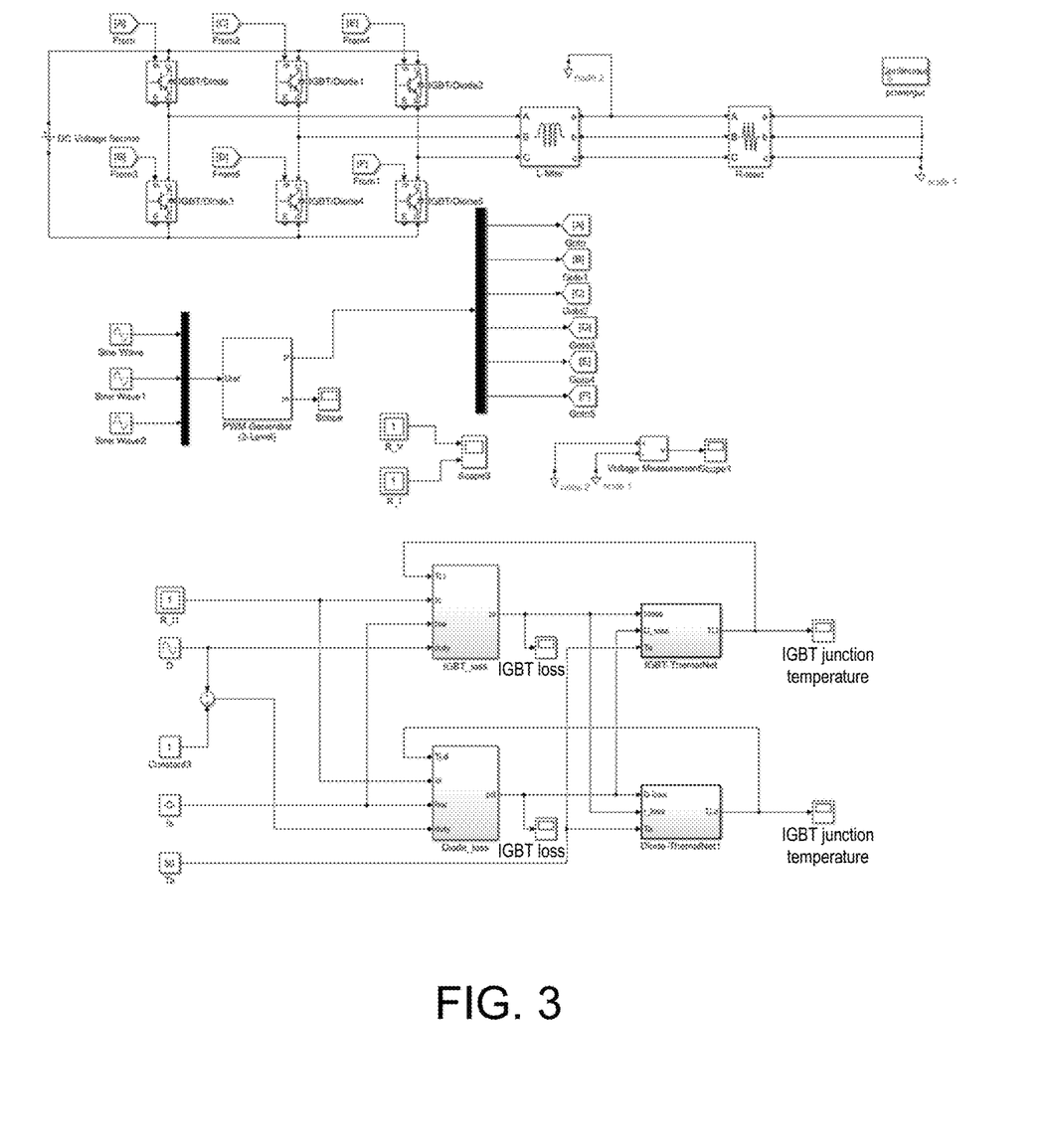
FIG. 3 is an electro-thermal coupling simulation model of an IGBT module according to an embodiment of the disclosure.

Junction temperature fluctuations are the main cause of an IGBT failure. Due to different thermal expansion coefficients of the internal materials of the IGBT, the thermal stress on the internal structures will be disuniform. As a result, junction parts of internal materials such as a bonding wire, a solder layer, and a chip are often damaged. For a topological structure of the doubly-fed wind power converter as shown in FIG. 2, combined with the operating characteristics of the IGBT (a switching frequency $f_s$, a DC-side voltage $U_{dc}$, an on-current $I_c$, and a duty cycle $\delta$), an IGBT power loss model is derived. Based on a physical structure and an internal heat conduction process of the IGBT module, an IGBT thermal network equivalent model is derived. Finally, an electro-thermal coupling simulation model is contracted in MATLAB/Simulink, as shown in FIG. 3. Power loss values outputted by the power loss model are sent to the thermal network equivalent model of the IGBT module to perform simulated junction temperature calculation.

The IGBT module needs to withstand a large number of thermal stress cyclic shocks in the operating process. Assuming that $N_f$ is a fail cycle number of the IGBT module under the cyclic effect of a stress with an amplitude unchanged, when it is subjected to the cyclic effect of the stress for N times and N is less than $N_f$, although the IGBT module does not fail due to fatigue damage, a certain degree of fatigue damage has been generated. The cumulative damage degree may be used to express the specific size of the fatigue damage as follows:

$$D = \frac{N}{N_f}$$

If the device is subjected to the effect of k constant-amplitude stresses, and the number of shocks generated by each constant-amplitude stress is No times, the cumulative damage degree in this operating condition may be expressed as:

$$D = \sum_{i=1}^{k} D_i = \sum_{i=1}^{k} \frac{N_i}{N_{f,i}}$$

When the cumulative damage degree D reaches 1, it means that fatigue failure occurs in the device. In the actual operating process of the wind power converter, the solder layer of the IGBT module is prone to fatigue damage, and the thermal resistance increases as the device material ages. Considering the non-negligible effect of the aging process of the IGBT module itself on lifetime prediction, it is necessary to timely update thermal model parameters in the electro-thermal coupling model. When D≤0.2, it is determined that the IGBT module is in a health stage I, and the thermal network parameter of the electro-thermal coupling model is not corrected; when the cumulative damage degree 0.2<D≤0.4, it is determined that the IGBT module is in a health stage II, and the thermal network parameter of the electro-thermal coupling model is increased by 10%; when the cumulative damage degree 0.4<D≤0.6, it is determined that the IGBT module is in a health stage III, and the thermal network parameter of the electro-thermal coupling model is increased by 20%; when the cumulative damage degree 0.6<D≤0.8, it is determined that the IGBT module is in a health stage IV, and the thermal network parameter of the electro-thermal coupling model is increased by 30%; when the cumulative damage degree 0.8<D≤1, it is determined that the IGBT module is in a health stage V, and the thermal model parameter of the electro-thermal coupling model is increased by 40%.

Uniform sampling at an interval of 1 m/s is performed between a cut-in wind speed (3 m/s) and a cut-out wind speed (25 m/s) of the wind turbine to obtain 23 characteristic operating conditions of the wind power IGBT. The steady-state junction temperature values in different aging states of each characteristic operating condition are calculated to establish the steady-state junction temperature database of the IGBT.

(3) In a short-term time-scale profile, based on a SCADA monitoring data, effects of an ambient temperature and a wind speed are fully considered, a junction temperature data is outputted in real-time through the electro-thermal coupling model, and a real-time thermal stress cycle number is calculated by a rainflow-counting method.

Figure 4:
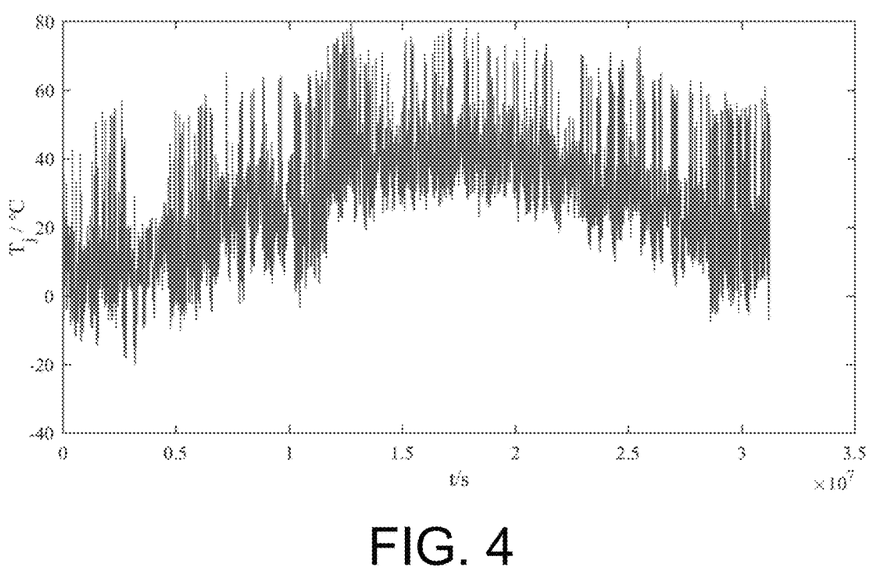
FIG. 4 is a real-time junction temperature curve of an IGBT of a grid-side converter according to an embodiment of the disclosure.
Figure 5:
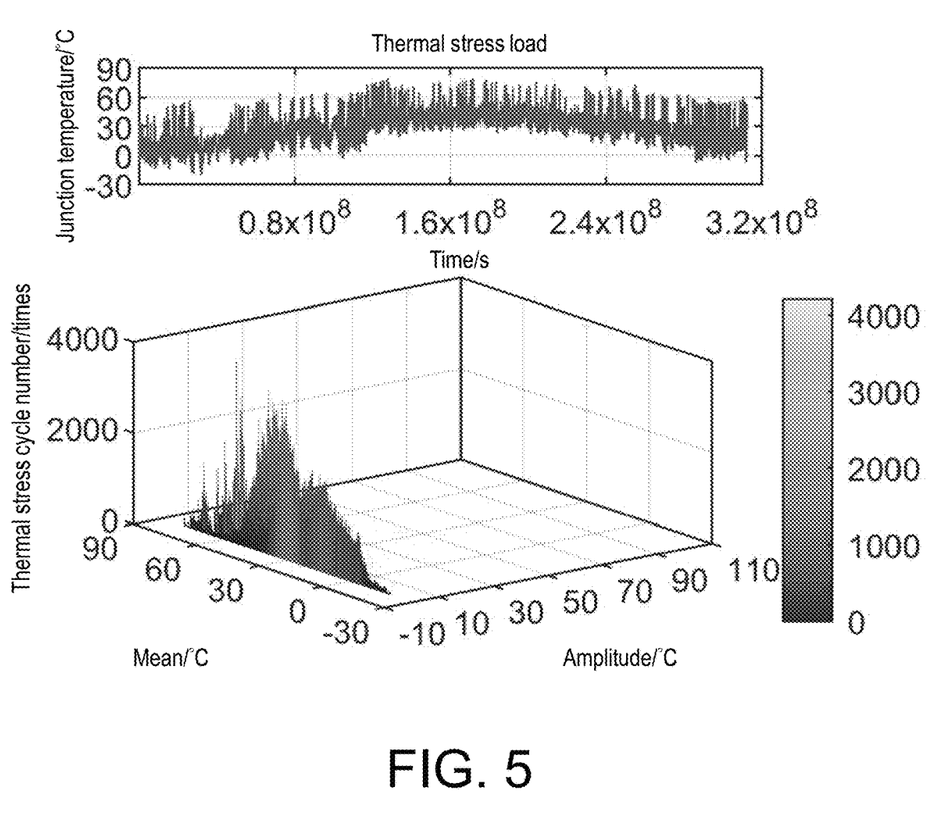
FIG. 5 is an output result of a rainflow-counting method according to an embodiment of the disclosure.

The wind speeds and ambient temperatures recorded in the SCADA database within one year are imported into a wind turbine model and the electro-thermal coupling model to obtain a real-time junction temperature curve of the IGBT of the grid-side converter, as shown in FIG. 4. Next, a thermal stress load distribution is extracted by the rainflow-counting method to calculate the real-time thermal stress cycle number $N_f$, i.e., a short-term reliability parameter, as shown in FIG. 5.

Figure 6:
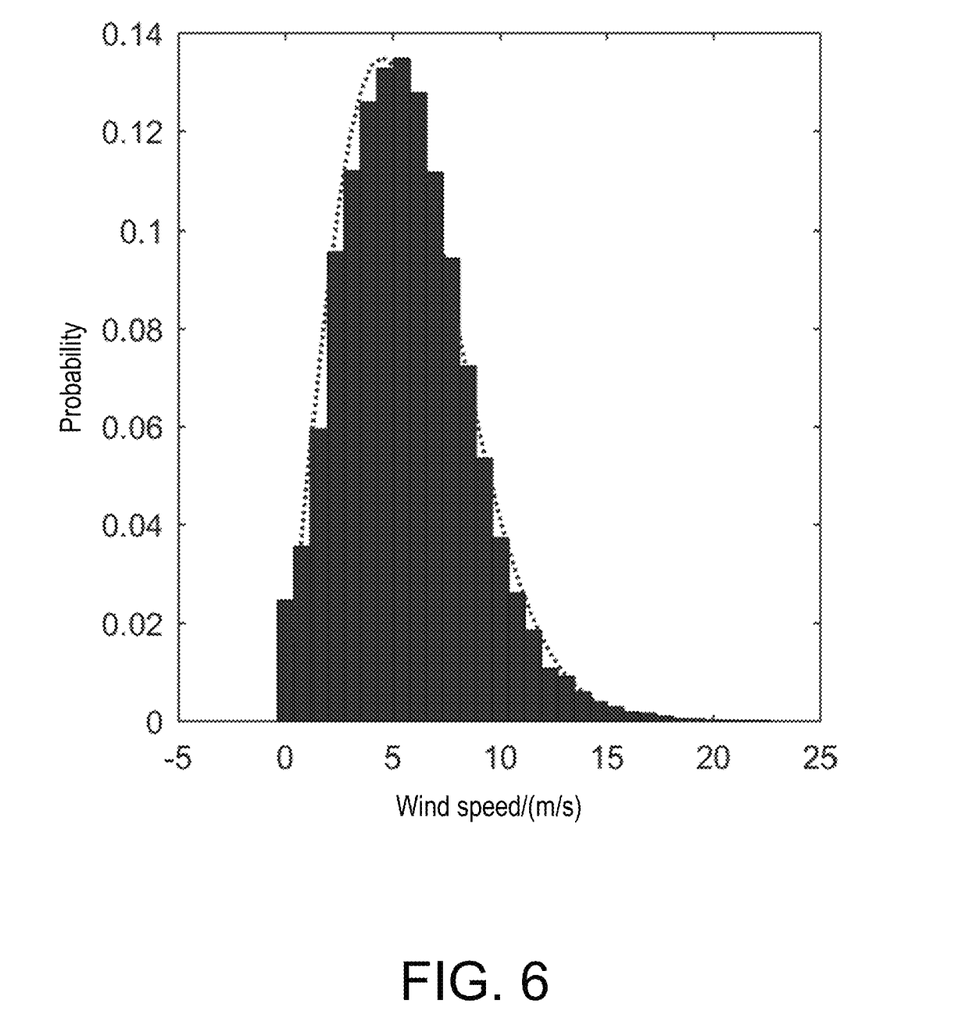
FIG. 6 is a Weibull probability distribution curve of year-round wind speeds of a wind farm according to an embodiment of the disclosure.

(4) In a long-term time-scale profile, a Weibull probability distribution model of the wind speed is established based on the SCADA monitoring data of the wind turbine to obtain a wind speed probability distribution curve, and after normalization, a thermal stress shock inspection number probability distribution is conducted. Combined with a Bayerer lifetime prediction model and the steady-state junction temperature database, a maximum thermal stress cycle number that the IGBT can withstand in different aging stages is obtained in advance.

The junction temperature of the IGBT of the wind power converter is most affected by wind speed fluctuations, and the wind speed probability characteristics of a wind field can be accurately described by a two-parameter Weibull distribution:

$$f(v) = \left(\frac{k}{c}\right) \cdot \left(\frac{v}{c}\right)^{k-1} \cdot \exp\left[-\left(\frac{v}{c}\right)^k\right]$$

In the formula, k is a Weibull distribution shape parameter determined by an average wind speed over a wind speed measurement period in the area, c is a Weibull distribution scale parameter determined by a wind speed standard deviation value, and v is a wind speed. An integration operation is performed on this formula to obtain a Weibull probability distribution function as follows:

$$F(v) = \int_0^{+\infty} f(v)dv = 1 - \exp\left[-\left(\frac{v}{c}\right)^k\right]$$

To take into account seasonal characteristics of the wind speed, the Weibull probability distribution is fitted with wind speed data in the SCADA database of the wind farm within one year. The fitted probability distribution curve is shown in FIG. 6, and the parameters are shown in Table 2.

TABLE 2

| | Weibull probability distribution parameters | | | |
|---|---|---|---|---|
| Time | Average wind speed/(m/s) | Standard deviation of wind speed/(m/s) | Weibull scale parameter | Weibull shape parameter |
| First season | 5.14 | 2.77 | 5.80 | 1.96 |
| Second season | 5.63 | 3.22 | 6.34 | 1.84 |
| Third season | 5.09 | 2.43 | 5.74 | 2.23 |
| Fourth season | 6.65 | 3.14 | 7.51 | 2.26 |
| Year | 5.63 | 2.97 | 2.00 | 6.35 |

The wind power converter studied in the embodiment of the disclosure adopts the IGBT module of Infineon. The Bayerer model is a lifetime prediction model fitted by Infineon for testing of its own products. It will be more in line with the reality to select this lifetime prediction model to simulate the aging process of the IGBT. The formula is:

$$N_f = K \cdot (\Delta T_j)^{-\beta_1} \cdot e^{-\beta_2/(T_{jmax}+273)} \cdot t_{on}^{\beta_3} \cdot I^{\beta_4} \cdot V^{\beta_5} \cdot D^{\beta_6}$$

In the formula, $T_{jmax}$ is a maximum junction temperature; a parameter K is a model correction coefficient; $\beta_1$ and $\beta_2$ are respectively a junction temperature fluctuation index and a maximum junction temperature index; $\beta_3$ to $\beta_6$ are respectively indexes of a power cycle heating time, a device withstand voltage rating, a bonding wire current value, and a bonding wire diameter.

Figure 7:
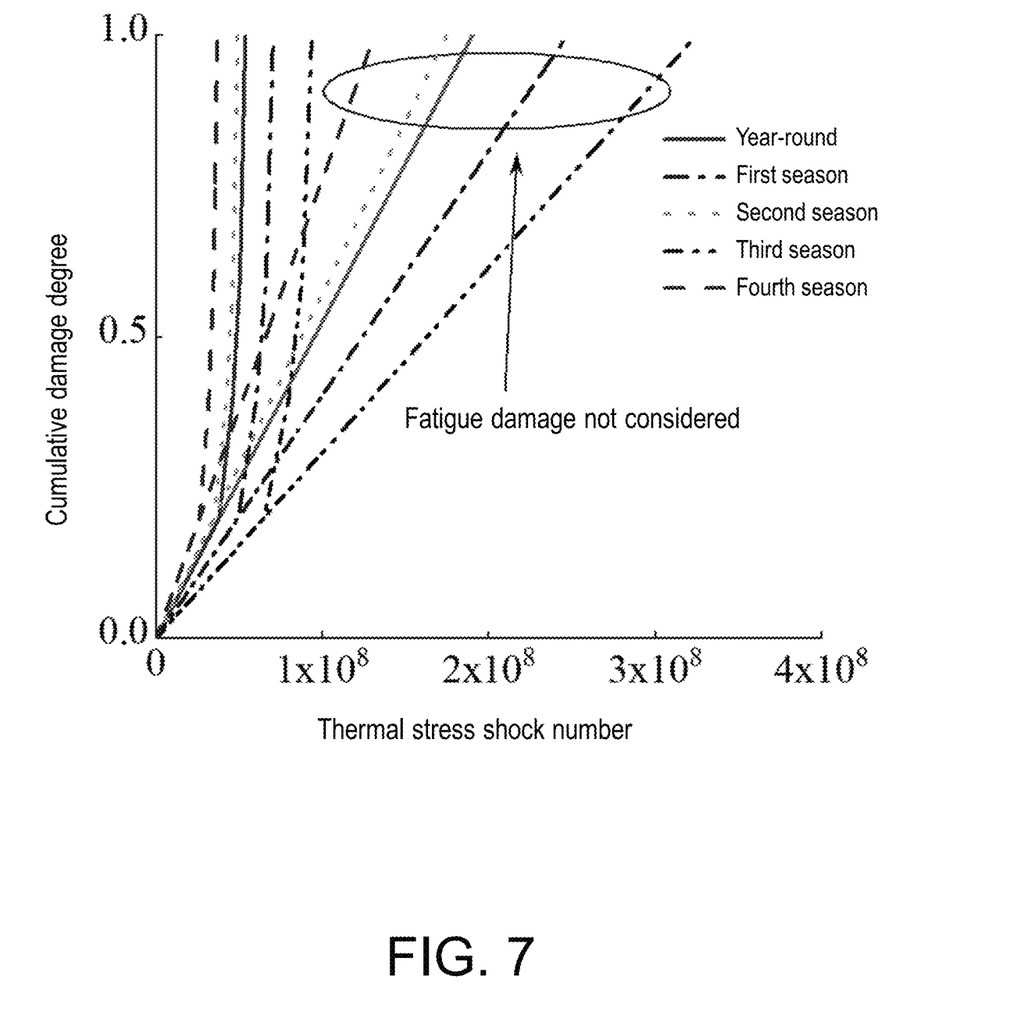
FIG. 7 is an aging process of an IGBT module according to an embodiment of the disclosure.

Table 2 shows the wind speed probability distributions of different seasonal characteristics, and after normalization, a probability distribution of a thermal stress cyclic shock number is conducted. Then, in the process of thermal stress cyclic shocks, the aging process is constantly monitored, the corresponding junction temperature database is timely selected, and combined with the Bayerer lifetime prediction model, the aging process of the IGBT in the entire lifetime cycle is thereby accurately simulated, as shown in FIG. 7. It is found that in the operating process of the wind power converter, wind conditions of different seasonal characteristics will cause different damages to the IGBT. It is necessary to consider the effect of the wind speed probability distribution when studying the reliability of the wind power IGBT. Finally, the maximum thermal stress cycle number $N_m$ that the IGBT can withstand before failure is obtained, i.e., a long-term reliability parameter.

(5) Taking the thermal stress cycle number as a connecting amount, a cumulative damage degree and an estimated lifetime of the IGBT of the grid-side converter of the wind power converter are calculated.

In the short-term time-scale profile, the real-time thermal stress cycle number $N_t$ of the IGBT module in the current operating state is obtained. In the long-term time-scale profile, the maximum withstanding cyclic shock number $N_m$ of the IGBT considering the fatigue damage is obtained. Taking the thermal stress cycle number as a connection in the multi-time-scale calculation, reliability evaluation is performed:

$$D_t = \frac{N_t}{N_m}$$

$$S = \left(\frac{T}{D_t}\right) / (3600 {}^* 24 {}^* 365)$$

In the formula, $D_t$ represents the real-time cumulative damage degree, S represents the estimated life, and T represents a length of a time series of the monitoring data.

Table 3 shows output results of different time-scale calculations, in which statistical data of the cumulative damage degree and the service lifetime of the IGBT module of the wind power converter of the same type are taken as mathematical expectations. It is learned that the multi-time-scale calculation can compensate for the defect that a single observation scale cannot take into account the fatigue damage, and more accurately reflect the health condition of the IGBT module of the wind power converter.

TABLE 3

Comparison of output results of different time-scale calculations

| Time Scale | Cumulative damage degree | Damage degree error | Lifetime prediction/year | Lifetime prediction error |
|---|---|---|---|---|
| Single observation scale | 0.029 | 40.82% | 34.48 | 50.63% |
| Multiple time scales | 0.045 | 8.16% | 22.22 | 8.87% |
| Mathematical Expectation | 0.049 | — | 20.41 | — |

Embodiment 3

An embodiment of the disclosure provides a multi-time-scale reliability evaluation system of a wind power IGBT considering fatigue damage, including a time scale division module, a steady-state junction temperature database establishment module, a short-term reliability analysis module, a long-term reliability analysis module, and a reliability evaluation module.

The time scale division module is configured to divide a time scale of reliability evaluation and comprehensively extract lifetime information of a power device by using multiple time scales.

The steady-state junction temperature database establishment module is configured to establish an electro-thermal coupling model of an IGBT module for a topology of a wind power converter and an IGBT model to obtain a junction temperature data, and combined with an IGBT fatigue damage theory, establish a steady-state junction temperature database of the IGBT in different aging states.

The short-term reliability analysis module is configured to, in a short-term time-scale profile, fully consider effects of an ambient temperature and a wind speed based on a SCADA monitoring data, output the junction temperature data in real-time through the electro-thermal coupling model, and calculate a real-time thermal stress cycle number.

The long-term reliability analysis module is configured to, in a long-term time-scale profile, establish a Weibull probability distribution model of the wind speed based on the SCADA monitoring data of a wind turbine to obtain a wind speed probability distribution curve, and after normalization, conduct a thermal stress shock inspection number probability distribution, and combined with a Bayerer lifetime prediction model and the steady-state junction temperature database, obtain in advance a maximum thermal stress cycle number that the IGBT can withstand in different aging stages.

The reliability evaluation module is configured to calculate a cumulative damage degree and an estimated lifetime of the IGBT of the wind power converter by taking the thermal stress cycle number as a connection between evaluation results of the different time scales.

Reference may be made to the descriptions in the method embodiment for the specific implementation of each module, which will not be repeated herein.

Embodiment 4

The disclosure further provides a computer-readable storage medium, such as a flash memory, a hard disk, a multimedia card, a card-type memory (e.g., an SD or a DX memory), a random access memory (RAM), a static random access memory (SRAM), a read only memory (ROM), an electrically erasable programmable read only memory (EEPROM), a programmable read only memory (PROM), a magnetic storage, a disk, a CD, a server, an application store, etc., on which a computer program is stored, and when executed by a processor, the program realizes the multi-time-scale reliability evaluation method of a wind power IGBT considering fatigue damage in the method embodiment.

It is noted that, according to the implementation requirements, each step/component described herein may be divided into more steps/components, and it is also possible to combine two or more steps/components or partial operations of the steps/components into a new step/component to achieve the objective of the disclosure.

Those skilled in the art can easily understand that the above descriptions are only exemplary embodiments of the disclosure and are not intended to limit the disclosure. Any modification, equivalent replacement, and improvement made within the spirit and principle of the disclosure shall be included in the protection scope of the disclosure.

What is claimed is:

1. A multi-scale reliability evaluation method of a wind power Insulated Gate Bipolar Transistor (IGBT) considering fatigue damage, comprising:
    (1) dividing a time scale of reliability evaluation, and comprehensively extracting lifetime information of a power device by using multiple time scales;
    (2) establishing an electro-thermal coupling model of an IGBT module for a topology of a wind power converter and an IGBT model to obtain a junction temperature data, and combined with an IGBT fatigue damage theory, establishing a steady-state junction temperature database of the IGBT in different aging states;
    (3) in a short-term time scale profile, fully considering effects of an ambient temperature and a wind speed based on a Supervisory Control and Data Acquisition (SCADA) monitoring data, outputting the junction temperature data in real-time through the electro-thermal coupling model, and calculating a real-time thermal stress cycle number;
    (4) in a long-term time-scale profile, establishing a Weibull probability distribution model of the wind speed based on the SCADA monitoring data of a wind turbine to obtain a wind speed probability distribution curve, and after normalization, conducting a thermal stress shock inspection number probability distribution, and combined with a Bayerer lifetime prediction model and the steady-state junction temperature database, obtaining in advance a maximum thermal stress cycle number that the IGBT can withstand in different aging stages; and
    (5) calculating a cumulative damage degree and an estimated lifetime of the IGBT of the wind power converter by taking the maximum thermal stress cycle number as a connection between evaluation results of the different time scales.

2. The method according to claim 1, wherein the step of dividing the time scale of reliability evaluation comprises:
    in the long-term time-scale profile, primarily considering power device aging characteristics, and ignoring transient details of junction temperature fluctuations to only consider a steady-state junction temperature and thereby maintain a high calculation efficiency; and
    in the short-term time-scale profile, primarily considering the effects of the wind speed and the ambient temperature, and fully considering an observed junction temperature fluctuation data.

3. The method according to claim 2, wherein the step of establishing the steady-state junction temperature database of the IGBT in different aging states comprises:
    using a cumulative damage degree D to reflect a damage degree of the IGBT module based on a fatigue damage theory, wherein when D≤a thermal network parameter of the electro-thermal coupling model is not corrected; when the cumulative damage degree a<D≤b, the thermal network parameter of the electro-thermal coupling model is increased according to a first predetermined value; when the cumulative damage degree b<D≤c, the thermal network parameter of the electro-thermal coupling model is increased according to a second predetermined value; when the cumulative damage degree c<D≤d, the thermal network parameter of the electro-thermal coupling model is increased according to a third predetermined value; and when the cumulative damage degree d<D≤e, the thermal model parameter of the electro-thermal coupling model is increased according to a fourth predetermined value, wherein the first predetermined value, the second predetermined value, the third predetermined value, and the fourth predetermined value sequentially increase, and values of a, b, c, d, and e sequentially increase; and
    performing sampling between a cut-in wind speed and a cut-out wind speed of the wind turbine to obtain characteristic operating conditions of the wind power IGBT, and calculating steady-state junction temperature values outputted by the electro-thermal coupling model in different aging states of each characteristic operating condition to establish the steady-state junction temperature database of the IGBT.

4. The method according to claim 3, wherein the cumulative damage degree is determined according to $$D = \frac{N}{N_f},$$

wherein $N_f$ is a fail cycle number of the IGBT module under a cyclic effect of a stress with an amplitude unchanged, and N represents a number of cycles of being subjected to the stress.

5. The method according to claim 1, wherein Step (4) comprises:
    establishing the Weibull probability distribution model of the wind speed based on the SCADA monitoring data of the wind turbine to obtain the wind speed probability distribution curve;
    after normalization, conducting the thermal stress shock inspection number probability distribution, and determining an aging process of the IGBT to select a steady-state junction temperature database corresponding to an aging stage; and
    combined with the Bayerer lifetime prediction model and the selected steady-state junction temperature database, obtaining in advance the maximum thermal stress cycle number that the IGBT can withstand in different aging stages.

6. The method according to claim 2, wherein Step (4) comprises:
    establishing the Weibull probability distribution model of the wind speed based on the SCADA monitoring data of the wind turbine to obtain the wind speed probability distribution curve;
    after normalization, conducting the thermal stress shock inspection number probability distribution, and determining an aging process of the IGBT to select a steady-state junction temperature database corresponding to an aging stage; and
    combined with the Bayerer lifetime prediction model and the selected steady-state junction temperature database, obtaining in advance the maximum thermal stress cycle number that the IGBT can withstand in different aging stages.

7. The method according to claim 3, wherein Step (4) comprises:

establishing the Weibull probability distribution model of the wind speed based on the SCADA monitoring data of the wind turbine to obtain the wind speed probability distribution curve;

after normalization, conducting the thermal stress shock inspection number probability distribution, and determining an aging process of the IGBT to select a steady-state junction temperature database corresponding to an aging stage; and combined with the Bayerer lifetime prediction model and the selected steady-state junction temperature database, obtaining in advance the maximum thermal stress cycle number that the IGBT can withstand in different aging stages.

8. The method according to claim 4, wherein Step (4) comprises:

establishing the Weibull probability distribution model of the wind speed based on the SCADA monitoring data of the wind turbine to obtain the wind speed probability distribution curve;

after normalization, conducting the thermal stress shock inspection number probability distribution, and determining an aging process of the IGBT to select a steady-state junction temperature database corresponding to an aging stage; and combined with the Bayerer lifetime prediction model and the selected steady-state junction temperature database, obtaining in advance the maximum thermal stress cycle number that the IGBT can withstand in different aging stages.

9. The method according to claim 5, wherein Step (5) comprises:

in the short-term time-scale profile, obtaining the real-time thermal stress cycle number of the IGBT module in a current operating state;

in the long-term time-scale profile, obtaining a maximum withstanding cyclic shock number of the IGBT considering fatigue damage; and synthesizing output results at the respective time scales by taking the thermal stress cycle number as a connection to calculate a real-time cumulative damage degree and the estimated lifetime of the IGBT of the wind power converter.

10. The method according to claim 9, wherein the real-time cumulative damage degree of the IGBT of the wind power converter is calculated according to $$D_t = \frac{N_t}{N_m},$$

wherein $N_t$ represents the real-time thermal stress cycle number of the IGBT module in a current operating state obtained in the short-term time-scale profile, and $N_m$ represents the maximum withstanding cyclic shock number of the IGBT considering fatigue damage obtained in the long-term time-scale profile.

11. The method according to claim 10, wherein the estimated lifetime is calculated according to $$S = \left(\frac{T}{D_t}\right) / (3600 * 24 * 365),$$

wherein T represents a length of a time series of the monitoring data.

12. A multi-scale reliability evaluation method of a wind power Insulated Gate Bipolar Transistor (IGBT) considering fatigue damage, comprising:

a time scale division module configured to divide a time scale of reliability evaluation and comprehensively extract lifetime information of a power device by using multiple time scales;

a steady-state junction temperature database establishment module configured to establish an electro-thermal coupling model of an IGBT module for a topology of a wind power converter and an IGBT model to obtain a junction temperature data, and combined with an IGBT fatigue damage theory, establish a steady-state junction temperature database of the IGBT in different aging states;

a short-term reliability analysis module configured to, in a short-term time-scale profile, fully consider effects of an ambient temperature and a wind speed based on Supervisory Control and Data Acquisition (SCADA) monitoring data, output the junction temperature data in real-time through the electro-thermal coupling model, and calculate a real-time thermal stress cycle number;

a long-term reliability analysis module configured to, in a long-term time-scale profile, establish a Weibull probability distribution model of the wind speed based on the SCADA monitoring data of a wind turbine to obtain a wind speed probability distribution curve, and after normalization, conduct a thermal stress shock inspection number probability distribution, and combined with a Bayerer lifetime prediction model and the steady-state junction temperature database, obtain in advance a maximum thermal stress cycle number that the IGBT can withstand in different aging stages; and a reliability evaluation module configured to calculate a cumulative damage degree and an estimated lifetime of the IGBT of the wind power converter by taking the maximum thermal stress cycle number as a connection between evaluation results of the different time scales.

13. A computer-readable storage medium having a computer program stored thereon, wherein the computer program implements the steps of the method according to claim 1 when the computer program is executed by a processor.

14. A computer-readable storage medium having a computer program stored thereon, wherein the computer program implements the steps of the method according to claim 2 when the computer program is executed by a processor.

15. A computer-readable storage medium having a computer program stored thereon, wherein the computer program implements the steps of the method according to claim 3 when the computer program is executed by a processor.

16. A computer-readable storage medium having a computer program stored thereon, wherein the computer program implements the steps of the method according to claim 4 when the computer program is executed by a processor.

17. A computer-readable storage medium having a computer program stored thereon, wherein the computer program implements the steps of the method according to claim 5 when the computer program is executed by a processor.

18. A computer-readable storage medium having a computer program stored thereon, wherein the computer program implements the steps of the method according to claim 9 when the computer program is executed by a processor.

19. A computer-readable storage medium having a computer program stored thereon, wherein the computer program implements the steps of the method according to claim 10 when the computer program is executed by a processor.

20. A computer-readable storage medium having a computer program stored thereon, wherein the computer program implements the steps of the method according to claim 11 when the computer program is executed by a processor.

* * * * *